United States Patent Office

Re. 25,884
Reissued Oct. 19, 1965

25,884

PIGMENT PAPER COATING COMPOSITION

Thomas L. Reiling, Dedham, Mass., assignor to Blandin Paper Company, Grand Rapids, Minn., a corporation of Minnesota No Drawing. Original No. 3,002,844, dated Oct. 3, 1961, Ser. No. 856,383, Dec. 1, 1959. Application for reissue Oct. 1, 1963, Ser. No. 327,858
12 Claims. (Cl. 106—128)

Matter enclosed in heavy brackets [ ] appears in the original patent but forms no part of this reissue specification; matter printed in italics indicates the additions made by reissue.

The present invention relates to [the manufacture of coatings for paper] *paper coating,* and more particularly, to [a] *paper* coating compositions, *and* [having many of the desired properties and advantages of a so-called "cast" coating.] *to papers coated therewith.*

Cast coatings, which are obtained by casting the coating material on a polished drum and releasing the coating material from the drum to the paper, are used in most instances where smooth, bright, glossy, ink-receptive papers are required. Many thousands of tons of paper having these properties, which are hereinafter referred to as eye-appeal, are required each year for labels, magazine covers, stock for printing advertising matter, and stock for other similar purposes. Such stock is expensive, because its production is slow and the capital outlay required for the machinery necessary for cast coatings is very great. Consequently, the art has long sought suitable substitutes for cast coated paper stock, but to the best of my knowledge, heretofore no such substitute has been available.

It is, therefore, the object of this invention to produce a coating composition which may be applied to paper stock by conventional coating equipment and which provide a sheet of paper stock having the properties of a cast coated sheet.

A further object of this invention is to provide a coating composition for paper stock, which may be applied at greater speed than cast coated compositions, and which will provide a sheet having eye-appeal, as hereinabove defined.

A further object of this invention is to provide a coating for standard fine printing papers which does not require calendering.

*A further object of this invention is to provide compositions which can be applied to paper using conventional paper coating equipment in a very thin or lightweight layer to achieve great gains in opacity or light refraction, and which can be supercalendered to produce superior lightweight printing papers.*

*A further object of this invention is to provide methods for introducing pigment into a liquid hydrocarbon-in-water emulsion containing dissolved protein.*

*A further object of this invention is to provide new types of coated papers and the like produced using the coating compositions of this invention and conventional paper coating techniques.*

Still further objects and advantages of the invention will appear from the following description and appended claims.

The invention is based on the surprising discovery that a composition of matter prepared by intermixing two [components,] *separately prepared formulations,* the first *formulation containing* [consisting of an] alkali soluble, *water insoluble* protein, [oil] *liquid hydrocarbon* and water in the form of an emulsion, and the second [consisting of a] *formulation containing* water soluble gum, [such as glue, a] *paper* pigment [material such as clay or other filler] and water [results in the formation of a suspension of a protein coated pigment composition having] *in the form of a suspension, has* exceptionally good paper coating characteristics. My composition has a desirably high solids content and may be applied to paper stock by conventional paper coating machinery and thereafter dried to a *generally* hard, bright, glossy, smooth surface which has improved ink receptivity and varnish holdout, yielding, *for example,* an excellent high gloss print. Because my novel coating composition may be applied to paper webs by conventional paper coating machinery, paper coated in accordance with my process may be coated at much greater speeds than paper coated with the so-called casting process.

The advantages of using an emulsion of water and [oil] *liquid hydrocarbon* in combination with an alkali soluble, *water insoluble* protein to provide a coating having improved opacity and brightness, were first taught by Kress et al., U.S. Patent #2,339,707. However, the Kress invention is subject to several serious limitations, in that the oil-water-protein ratios must be such that the solids content of the coating is insufficient to enable the coating to be used economically in modern coating machinery. [The] *Furthermore, the direct* addition of *finely divided, water insoluble, and liquid hydrocarbon insoluble* solids to the protein, petroleum, water emulsion recommended by Kress results in an appreciable loss of brightness, opacity, and gloss when as little as 3% of pigment or filler is incorporated in the mixture. *However,* I have found that the addition of a *suspension of a paper pigment in aqueous solution of a water soluble* gum [, such as animal glue, vegetable glue, or other water soluble gum, and a pigment, when first mixed together and thereafter added] to a protein, oil, water emulsion preserves the desired *paper coating* properties of opacity, brightness, printability, and gloss obtained by using an alkali soluble protein, oil and water emulsion, and at the same time, enhances the scuff-resistant properties and provides *a relatively high* solids *content* for the composition, so that it may be used in conventional coating machinery.

In this specification I use the words, "paper pigment" [and "paper filler" interchangeably. By these words I mean] to include the finely subdivided solid, *substantially insoluble,* materials which are *commonly* used for surface treating of paper sheeting, including but by no means limited to chalk, talc, calcium carbonate, clay, walnut flour, titanium [.] dioxide, satin white, and the like, *and any mixtures of these.* [These] *As those skilled in the art will appreciate,* paper pigments are *sometimes* distinguishable from the *so-called coloring pigments* [, both in purpose and in utility,] since the coloring pigments such as iron oxide, umber, carbon black, copper oxide and the like [would] *frequently* so color the emulsion as to make it of little value in paper coating. Also, these coloring pigments would provide little if any filler action on the surface of the raw paper sheet material and therefore are [inoperable] *commonly unsuitable* for the purpose of this invention.

*I use the term "alkali soluble, water insoluble protein" in the same sense as it is used in the above referred to Kress et al. patent to refer to a conventional proteinaceous material which dissolves in aqueous solution having a pH above 7. Examples include isolated soya proteins in either unmodified or modified forms, casein, and any mixtures or equivalents thereof. The preferred alkali is ammonium hydroxide, but this can optionally be replaced in whole or in part by any other alkalis normally employed for dissolving water insoluble proteins.*

*By the word "gum" I have reference to the conventional meaning of this term in the paper industry whereby reference is had to a generally high molecular weight,*

*organic material of natural or synthetic origin which is water soluble and adapted for use as an adhesive. Thus, the term includes animal glues, vegetable glues (starches such as potato dextrin) polyvinyl alcohol, methyl cellulose, and any mixtures and equivalents of these substances.*

*The term "liquid hydrocarbon" I use herein in its conventional sense to refer to an inert, oily, water insoluble, volatile liquid chemically consisting substantially of carbon and hydrogen.*

Going into more detail, I have found that by [forming] *mixing* an emulsion of a hydrocarbon [,] *in* water [, and a] *containing a dissolved alkali soluble,* water insoluble protein [and thereafter adding] *with a suspension of water,* a paper pigment [of the type heretofore defined, water] and a *dissolved* gum, [such as animal glue,] I provide a surface coating for papers which is smooth, highly ink-receptive, has gloss and brightness characteristics which are comparable to the most expensive cast coatings, and is more scuff resistant (i.e. resistant to marring or surface deformation, when brought in contact with or abraded by foreign materials), than are the most expensive heavily pigmented paper coatings. [I have found] *While I do not wish to be bound, I believe from my observations* that *when one of my emulsion-suspensions is broken, as by evaporation of the volatile components,* an alkali soluble, *water insoluble* protein will precipitate as fine [d] particles and adhere to the surface of the pigment *particles* and change the character of the pigment surface from a dull, semi-translucent and extremely ink-receptive surface to a surface having high gloss, excellent opacity and controlled ink receptivity. The protein particles which adhere to the pigment particles and co-precipitate onto the surface of the paper when the emulsion is broken, provide a paper coating having the desired characteristics. Furthermore, unlike the usual pigmented coatings, the coating compositions of my invention are more resistant to the deep penetration of oil or varnish present in ink, and thereby reduce the amount of ink required for surface coverage and reduce the drying time of the ink required for surface coverage of the sheet. Paper coated with the compositions of my invention resists the tendency of ink to show through the paper, because of higher opacity of the surface and because less ink is required to accomplish the same result, and this latter property, the ability to retard ink absorption, I refer to as improved varnish hold out.

[My composition comprises] *As indicated, my compositions are produced by mixing an emulsion with a suspension. The emulsion contains* between *about* 5 and [20] *20* parts of [an] *dissolved* alkali soluble-water insoluble protein, [such as alpha protein or soya protein,] between *about* [80] *80* and 95 parts of water, between *about* 5 and [60] *60* parts of a liquid hydrocarbon, *and sufficient dissolved water soluble alkali to dissolve said protein.* [and between 10 and 90 parts of a gum pigment mixture, where the mixture is made up of] *The suspension contains* between *about* 5 and 75 parts of paper pigment, between *about* 5 and 75 parts of *dissolved* water soluble gum, and between *about* 40 and 95 parts of water. The *water* soluble gum, which I prefer to use is animal glue, and I prefer to use soya protein as the *alkali soluble,* water insoluble protein, however, I find that casein can also be used to good advantage. The liquid hydrocarbon [which is used, and] which I prefer to use is diesel oil, although kerosene or higher boiling liquid hydrocarbon materials can be used in practising my invention.

*I make my emulsions in the conventional manner, as taught, for example, by Kress et al. My suspensions may be prepared by first dissolving the water soluble gum in water and then adding thereto a previously prepared aqueous dispersion of the pigment. It will be appreciated that the pigment can first be added to the water and then the gum added, or the pigment and gum can be added together. I like to use heat to promote gum dissolution*

*and intermixing of pigment with gum. Optionally, in preparing paper compositions of the invention, a gum can be dissolved in the water phase of the emulsion before or after mixing the suspension with the emulsion. The emulsion can be admixed with the suspension by any conventional means. While the respective compositions of the emulsion and of the suspension can vary widely, I maintain the water soluble gum to alkali soluble, water insoluble protein ratio within fixed ranges in my emulsion-suspension coating compositions (see statement below concerning weight ratio of gum to protein). The product emulsion-suspension is generally used rather quickly following preparation, and I have observed no particular stability or storage problems.*

*As indicated, the compositions of this invention can be coated upon paper using conventional paper coating equipment.*

The following examples will serve to illustrate preferred embodiments of my invention and the methods followed in the practice thereof.

*Those skilled in the art will appreciate that many variations and modifications are possible within the teachings of the specification without departing from the spirit and scope of this invention.*

Example I.—A paper coating composition was made up by dissolving 20 pounds of alpha protein in ammonial solution. The water content of the solution was adjusted so that the solids therein amount to 20% of the solution. This solution is then allowed to cool to room temperature. Twenty pounds of the solution is then weighed out of the mass and twelve pounds of glue, animal glue, is added and the mixture is stirred until the glue is dissolved. To this mixture 10 pounds of diesel oil is added, and the mixture is agitated by a high speed mixer *to form an oil-in-water emulsion.* In a separate container, 8 pounds of *predispersed* clay, 8 pounds of potato dextrin, 16 pounds of water are mixed together with agitation [and heat] and are heated to thoroughly intermix the potato dextrin with the pigment *(i.e., the clay) to form a suspension and to dissolve (i.e., gelatinize) the potato dextrin.* The mass is then allowed to cool to room temperature. The mixture of potato dextrin, clay and water are then added to the protein, glue and oil emulsion, while the mass is being agitated by a high-speed mixer, such as a Lightning mixer. After the addition, the mass is cooled, and it is then ready to apply to paper with standard coating equipment. *The resulting emulsion-suspension is applied to a precoated base stock with a #20 Myer rod and the paper is dried. The coated paper product has good opacity, brightness, ink receptivity, and gloss.*

Example II.—About 200 pounds of casein protein was weighed into about 900 pounds of water. To enhance the [swelling] *dissolution* of protein, approximately 7 pounds of borax and about 20 pounds of 26° Bé. $NH_4OH$ was added. During the addition the entire mass was being agitated by three high-speed mixers, and the mass was heated to 140° F. The agitation continued for about 45 minutes with the heat turned off, and the temperature rose to 150° F. and then proceeded to cool to 98° F. *The resulting mixture contains the alkali soluble, water insoluble protein dissolved in alkaline aqueous solution.* This mixture was added slowly to 500 pounds of petroleum hydrocarbon (diesel oil) with a flash point of 162° F. The mass was agitated during this addition *and an oil-in-water emulsion was produced.*

Simultaneously, a second mixture consisting of a water solution of gum and pigment *particles suspended therein* and comprising 700 pounds of water, 100 pounds of calcium carbonate, 100 pounds of talc, 100 pounds of titanium dioxide and 200 pounds of *predispersed* clay and approximately 900 pounds of animal glue was prepared *by mixing these materials together in the water and applying a sufficient heat to dissolve the animal glue and promote intermixing of the pigment with the glue. The*

*mixture of gum and pigment is heated in the temperature range indicated with simultaneous agitation of the mixture to promote dispersion of the pigment particles until the glue is dissolved.* This second mixture was *then* added to the protein, oil, and water mixture and the mixing was continued until a creamy, smooth, uniform pigmented emulsion resulted. The resulting emulsion-*suspension* was applied to a *precoated* base stock with a #20 Myer rod, and the paper was dried. The resulting product had good opacity, brightness, and ink-receptivity, and a gloss favorably comparable with cast coatings.

Any of a wide range of hydrocarbons, including the petroleum distillates may be used for the purpose of my invention. I prefer to use the petroleum distillates which are colorless hydrocarbons and have flash points between about 100° F. and 250° F. Of course, petroleum distillates or other hydrocarbons having higher or lower flash points can be used. Although a colorless hydrocarbon is preferred, I find that hydrocarbons having small amounts of color can also be used, providing the color is not so intense as to effect the brightness of the coated paper.

The pigments which are used should be selected from materials having *average* particle sizes no*t* greater than *about* 100 microns (*in any one dimension*) since materials having larger particle sizes are difficult to coat smoothly on the surface of paper. [Paper pigments, such as calcium carbonate, chalk, or talc can be used alone or in combination with each other. Another suitable pigment is walnut flour.]

The order of adding the pigment to the emulsion is critical. [It must be added with the water soluble gum (i.e. the animal glue) as the mass is being agitated, so that the protein will precipitate on and adhere to the surface of the pigment.]

*The paper pigment must first be suspended in an aqueous solution of a water soluble gum before being mixed with the hydrocarbon liquid-in-water emulsion containing dissolved alkali soluble, water insoluble protein. I like to mix the emulsion with the suspension, or vice versa, while vigorously agitating the resulting mixture to promote complex mixing.*

Certain emulsifying agents such as ammonium [oliate] *oleate* or the like may be used to advantage in preparing the emulsions in accordance with my procedure. [However, these materials are not essential, and apart from facilitating the emulsification of oil and water, they do not enhance the compositions made in accordance with my invention.] Borax and/or sodium hydroxide, or other alkali materials may be added to solubilize the protein where water insoluble proteins are used, and these alkali materials provide sufficient surface activity between the oil and water to aid emulsification of the ingredients.

The ratio of water soluble gums to protein can be varied from 10% to 150%, depending upon the results [required.] *desired. Similarly, in preferred formulations,* [The] *the* amount of water soluble gum in relation to the amount of pigment must be at least 20% of gum to pigment. [Other gums, such as methyl cellulose, polyvinyl alcohol and the like can be used, and other protein material besides casein and soya flour can be used.]

The physical and chemical nature of this composition is not clearly understood. It is believed that the oil-protein-water mixture results in the formation of small, individual particles of spongy protein, which readily accept ink. The addition of [glue] *water dissolved gum* to the pigment causes the pores of the pigment to be closed, thereby allowing the spongy protein to coat the surface of the pigment, resulting in a coating which is essentially this spongy protein material, which gives the brightness, opacity, and other desired properties, including gloss, and printability. It has been found that the coating has the ability to readily accept ink and also has good varnish hold out, yielding an excellent high-gloss print and reducing the amount of ink required for complete coverage.

*It will be appreciated that in using a composition of the invention for coating a paper, one first coats the paper with one of my compositions and then dries same. The so-coated sheet bears a thin layer of a coherent mixture of water soluble gum, alkali soluble, water insoluble protein, and paper pigment, said coherent mixture being characterized by having a weight ratio of said gum to said protein of from about 10% to 150% and by having a weight ratio of gum to pigment of at least about 20%.*

Having thus described my invention, I claim:

[1. A paper coating composition which consists essentially of a suspension of a paper pigment and finely subdivided particles of protein in a liquid hydrocarbon-water emulsion, said protein and pigment forming a co-precipitate on the breaking of the emulsion with the particles of protein adhering to the pigment, said suspension consisting essentially of a dispersion of from 5 to 20 parts of an alkali soluble water insoluble protein selected from the group consisting of alpha protein, soya protein and casein and mixtures and equivalents thereof, between 80 and 95 parts of water, between 5 and 60 parts of a liquid hydrocarbon having a flash point between 100° F. and 250° F. and between 10 and 95 parts of a gum pigment mixture where said gum pigment mixture is made up of between 5 and 75 parts of a paper pigment, between 5 and 75 parts of a soluble gum selected from the group consisting of animal glue, methyl cellulose and polyvinyl alcohol and mixtures and equivalents thereof and between 40 and 95 parts of water.]

[2. A pigmented paper coating composition comprising a co-precipitate of pigment and protein from a suspension which is made up essentially by preparing a first mixture of an alkali soluble protein selected from the group consisting of alpha protein, soya protein and casein and mixtures and equivalents thereof, a liquid petroleum hydrocarbon having a flash point between 100° F. and 250° F. and water in the ratio of 5 to 20 parts of alkali soluble protein, between 5 and 60 parts of liquid hydrocarbon, and between 80 and 95 parts of water, preparing a second mixture of paper pigment, water soluble gum selected from the group consisting of animal glue, methyl cellulose and polyvinyl alcohol and mixtures and equivalents thereof and water in the ratio of 5 and 75 parts of pigment, 5 and 75 parts of gum, and 40 to 95 parts of water, adding the second mixture to the first and agitating the mass to form an emulsion suspension from which the co-precipitate is yielded when the emulsion is broken.]

[3. The product of claim 1 in which the pigment has a particle size of less than 100 microns.]

[4. The product of claim 2 in which the pigment has a particle size of less than 100 microns.]

[5. A process of manufacturing a coating composition for paper which comprises forming a first mixture by adding 5 to 20 parts of an alkali soluble protein selected from the group consisting of alpha protein, soya protein and casein to between 80 and 95 parts of water, adjusting the pH of the mixture to above 7, agitating the mixture while adding between 5 and 60 parts of a liquid hydrocarbon having a flash point of between 100° F. and 250° F. to form an emulsion, forming a second mixture by adding 5 to 75 parts of a water soluble gum selected from the group consisting of animal glue, methyl cellulose and polyvinyl alcohol to between 40 and 95 parts of water and adding 5 to 75 parts of a paper pigment and adding the second mixture to the first mixture to form a pigmented emulsion.]

*6. In a process for making a paper coating composition, the steps of:*

*(a) dissolving between about 5 and 20 parts by weight of soya protein in between about 80 and 95 parts by weight of water containing sufficient dissolved alkali to solubilize said protein, thereby to form a first solution,*

(b) emulsifying in said first solution between about 5 and 60 parts by weight of liquid hydrocarbon having a flash point between about 100° and 250° F., to form an emulsion, (c) dissolving between about 5 and 75 parts by weight of animal glue in between about 40 and 95 parts by weight of water to form a second solution, (d) dispersing in said second solution between about 5 and 75 parts by weight of coating clay to form a suspension, and (e) mixing together said emulsion and said suspension to form a homogeneous mixture.

7. In a process for making a paper coating composition, the steps of:

(a) dissolving between about 5 and 20 parts by weight of casein in between about 80 and 95 parts by weight of water containing dissolved therein sufficient alkali to dissolve said casein and thereby form a first solution, (b) emulsifying in said first solution between about 5 and 60 parts by weight of liquid hydrocarbon having a flash point between 100° and 250° F., (c) dissolving between about 5 and 75 parts by weight of animal glue in between about 40 and 95 parts by weight of water to form a second solution, (d) dispersing in said second solution between about 5 and 75 parts by weight of paper pigment, and (e) mixing together said emulsion and said suspension to form a homogeneous mixture.

8. In a process for making a paper coating composition, the steps of:

(a) dissolving between about 5 and 20 parts by weight of alkali-soluble, water-insoluble protein selected from the group consisting of alpha protein, soya protein, and casein, in between about 80 and 95 parts by weight of water containing dissolved therein sufficient alkali to dissolve said protein and thereby form a first solution, (b) emulsifying in said first solution between about 5 and 60 parts by weight of liquid hydrocarbon, (c) dissolving between about 5 and 75 parts by weight of water-soluble gum selected from the group consisting of animal glue, vegetable glue, methyl cellulose, and polyvinyl alcohol, in between about 50 and 95 parts by weight of water to form a second solution, (d) dispersing in said second solution between about 5 and 75 parts by weight of paper pigment, and (e) mixing together said emulsion and said suspension to form a homogeneous mixture.

9. A paper coating composition produced by mixing an emulsion with a suspension, said emulsion consisting essentially of:

(a) between 80 and 95 parts by weight of water, (b) between 5 and 20 parts by weight of dissolved alkali-soluble, water-insoluble protein selected from the group consisting of alpha protein, soya protein, and casein, and (c) between 5 and 60 parts by weight of liquid hydrocarbon, said liquid hydrocarbon being dispersed throughout said water; and said suspension consisting essentially of:

(d) between 40 and 95 parts by weight of water, (e) between 5 and 75 parts by weight of dispersed paper pigment throughout said water in the form of finely divided particles, and (f) between 5 and 75 parts by weight of a water-soluble gum selected from the group consisting of animal glue, vegetable glue, methyl cellulose, and polyvinyl alcohol, so that the amount of gum in relation to the amount of pigment is at least 20% of gum to pigment;

the amounts of the suspension and of the emulsion being such that the ratio of gum to protein is between 10% and 150%.

10. A paper coating composition in accordance with claim 9 wherein the pigment is composed of particles having average sizes of less than 100 microns.

11. A paper coating composition in accordance with claim 9 wherein said protein is soya protein.

12. A paper coating composition in accordance with claim 9 wherein said protein is casein.

13. A paper coating composition in accordance with claim 9 wherein said protein is alpha protein.

14. A paper coating composition in accordance with claim 9 wherein said protein is soya protein and said paper pigment is clay.

15. A paper coating composition in accordance with claim 9 wherein said water-soluble gum is animal glue.

16. A paper coating composition produced by mixing an emulsion with a suspension, said emulsion consisting essentially of:

(a) between 80 and 95 parts by weight of water, (b) between 5 and 20 parts by weight of dissolved soya protein, and (c) between 5 and 60 parts by weight of liquid hydrocarbon having a flash point between 100° and 250° F., said liquid hydrocarbon being dispersed throughout said water; and said suspension consisting essentially of:

(d) between 40 and 95 parts by weight of water, (e) between 5 and 75 parts by weight of dispersed coating clay throughout said water in the form of finely divided particles, and (f) between 5 and 75 parts by weight of dissolved animal glue so that the amount of glue in relation to the amount of clay is at least 20% of glue to clay, and the amounts of the suspension and of the emulsion being such that the ratio of glue to protein is between 10% and 150%.

17. A paper coated on at least one surface with the composition of claim 9.

References Cited by the Examiner

The following references, cited by the Examiner, are of record in the patented file of this patent or the original patent.

UNITED STATES PATENTS

| | | | |
|---|---|---|---|
| 175,683 | 4/76 | Fetzer | 106—129 |
| 1,816,978 | 8/31 | Knight | 106—135 |
| 2,059,465 | 11/36 | Kress et al. | 106—134 |
| 2,185,859 | 1/40 | Massey | 106—139 |
| 2,245,499 | 6/41 | Reichel et al. | 106—128 |
| 2,537,055 | 1/51 | Huon et al. | 106—135 |
| 2,933,406 | 4/60 | Salzberg | 106—125 |
| 2,995,414 | 8/61 | Paul | 106—139 |
| 3,108,009 | 10/63 | Clancy et al. | 106—135 |

ALEXANDER H. BRODMERKEL, *Primary Examiner.*

MORRIS LIEBMAN, *Examiner.*